Feb. 12, 1935.    D. BARBIERI    1,991,311
FOCUS AND EXPOSURE GAUGING DEVICE FOR CAMERAS
Filed Nov. 28, 1930    2 Sheets-Sheet 1
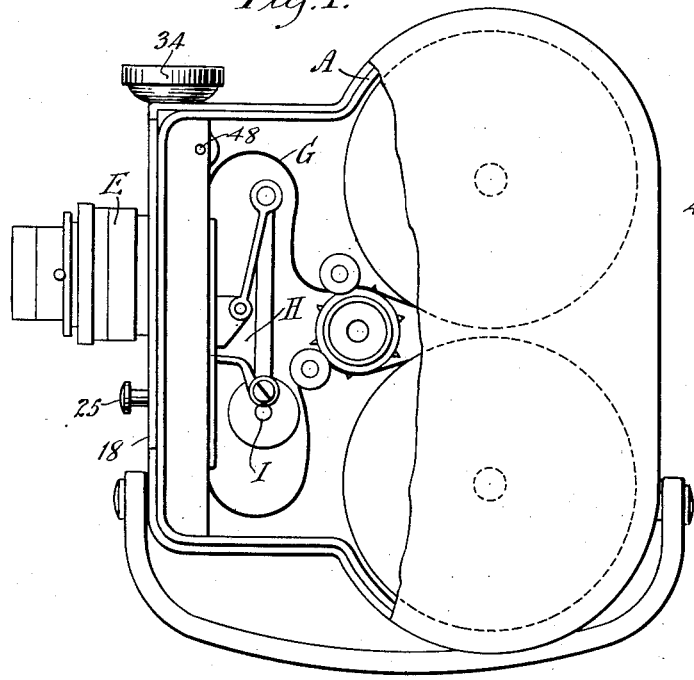
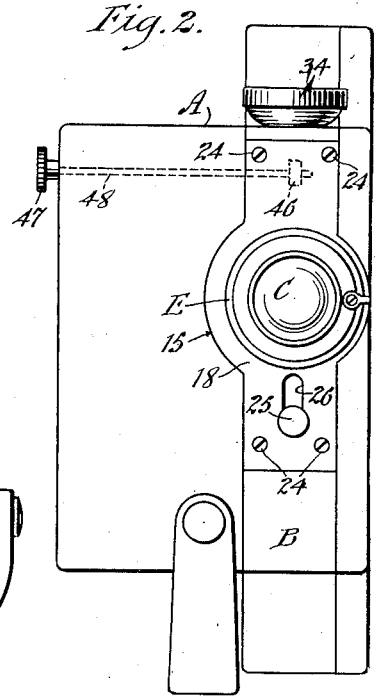
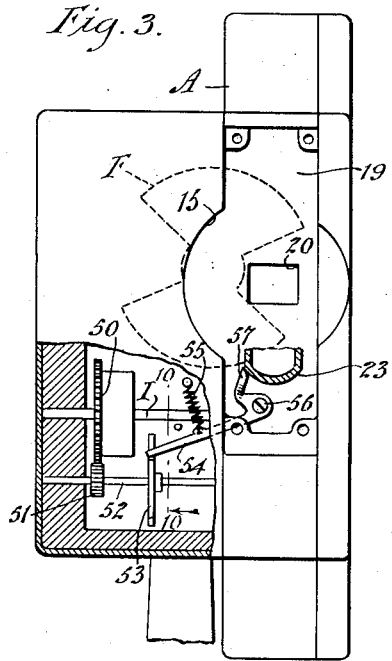
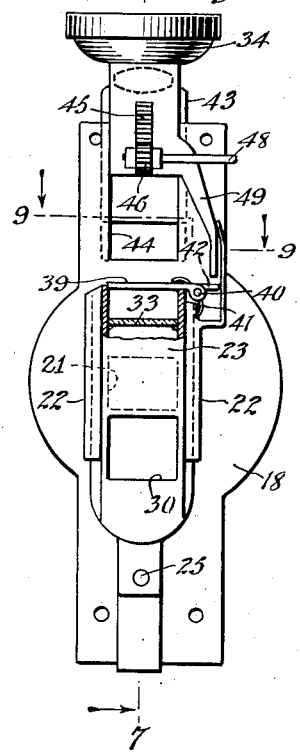
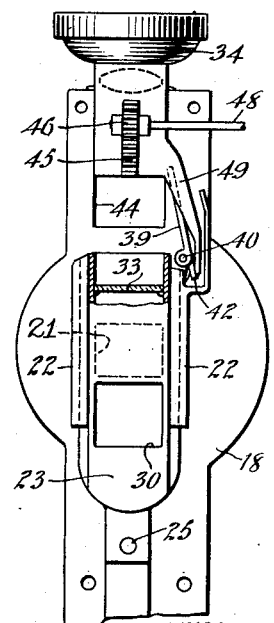
WITNESSES
Edw. Thorpe
INVENTOR
David Barbieri
BY Munn & Co.
ATTORNEYS Feb. 12, 1935.  D. BARBIERI  1,991,311
FOCUS AND EXPOSURE GAUGING DEVICE FOR CAMERAS
Filed Nov. 28, 1930  2 Sheets-Sheet 2

WITNESSES
Edw. Thorpe

INVENTOR
David Barbieri
BY
ATTORNEY

Patented Feb. 12, 1935

1,991,311

UNITED STATES PATENT OFFICE 1,991,311

FOCUS AND EXPOSURE GAUGING DEVICE FOR CAMERAS

David Barbieri, Garwood, N. J.

Application November 28, 1930, Serial No. 498,893

6 Claims. (Cl. 88—16)

This invention relates generally to cameras, and refers to a combined visual focus and exposure gauging device which, while not necessarily restricted to such use, is particularly applicable to and especially designed as an integral part of a motion picture camera.

The invention aims primarily to provide a combined focus and exposure gauging device which is built into and forms an integral part of a camera, whereby to afford means by virtue of which the image transmitted by the camera lens may be viewed by the user to visually accomplish a proper focusing of the lens with reference to the film and by means of which the lens opening or stop may be adjusted to obtain the proper exposure by a direct observation of the light admitted through the lens opening while the lens is focused upon the object to be photographed, and this without exposing any part of the film to the light or interfering with the subsequent operation of the camera.

The invention further embodies in a camera of the specified type, a combined focus and exposure gauging device in which a reflecting surface is mounted for movement respectively to and from its active position between the lens and the shutter, together with means for preventing operation of the shutter or, in the case of a motion picture camera, its film feeding mechanism and shutter when said device is in the active position, which would obstruct and prevent proper exposure of the film.

Some of the outstanding objects and advantages of the invention reside in the provision of a device of the indicated character which does not necessitate movement of the camera lens from its working axis; which permits of adjustment of the lens opening or stop without resorting to the reading of the stop calibrations, thereby making for a more rapid and accurate setting of the stop or lens opening; and which device insures a high degree of precision in the focusing of the lens upon the object to be photographed.

As a still further object, the invention contemplates a device of the character set forth, which employs but few and simple parts capable of economical production, assemblage and incorportion in practically any type of camera structure.

With the above recited and other objects in view, reference is had to the following description and accompanying drawings, in which there is exhibited one example or embodiment of the invention, while the claims define the actual scope of the same.

In the drawings:

Figure 1 is a side view of a motion picture camera equipped with a focus and exposure gauging device constructed in accordance with the invention, parts being broken away to disclose the underlying structure.

Figure 2 is a front view of the camera with the invention applied.

Figure 3 is a similar view with parts removed and broken away for particularly illustrating the feed mechanism control means.

Figure 4 is an enlarged rear face view of the cover plate and its component parts removed from the camera, and particularly illustrating the exposure meter screen in its active position.

Figure 5 is a similar view with the focusing finder in its active position and the exposure meter screen in its inactive position.

Figure 6:
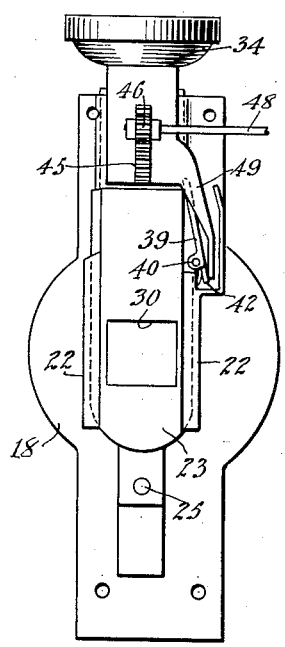
Figure 6 is a similar view illustrating the position of parts with the focusing finder in its inactive position.
Figure 7:
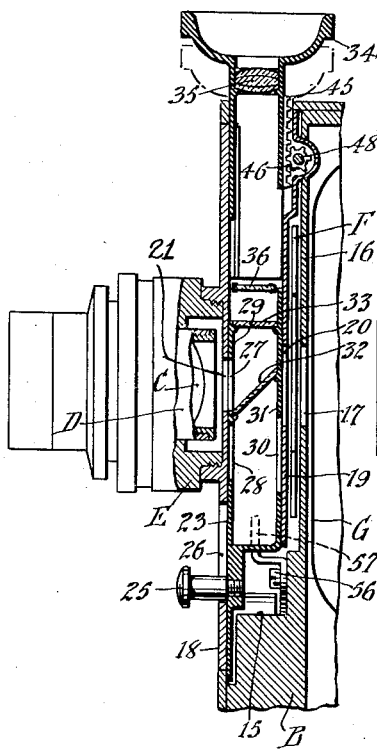
Figure 7 is a fragmentary vertical sectional view through the camera, taken approximately on the line indicated at 7—7 in Figure 4.
Figure 8:
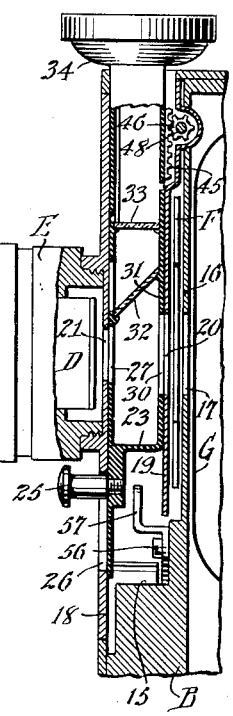
Figure 8 is a similar view illustrating the inactive position of the focusing finder and exposure meter.
Figure 9:
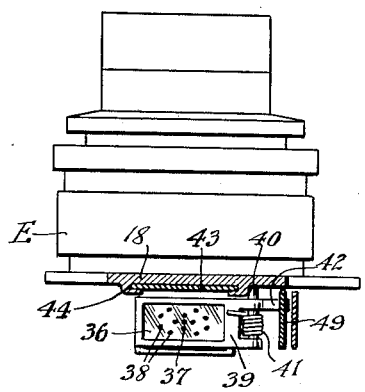
Figure 9 is a further enlarged sectional plan view taken approximately on the line indicated at 9—9 in Figure 4.

Referring to the drawings by characters of reference, A designates the body of a motion picture camera of any of the well known types that are now in general use or on the market. The front wall B of the camera is recessed at 15 to accommodate the focus and exposure gauging device which constitutes the subject matter of the present invention, and said recessed portion defines a rear wall which constitutes a part of the film track and which is provided with an aperture 17 disposed in alignment with the axis of the lens C which is carried by the lens barrel D, which lens barrel is mounted for axial focusing adjustment in the barrel E which is carried in turn by the front cover plate 18 which is disposed over and covers the recess 15 of the front wall B of the camera. Disposed in a plane parallel to and spaced forwardly from the rear wall 16, is a panel 19 which is provided with an aperture 20 disposed in alignment with the aperture 17 in the rear wall. A space is thus afforded between the rear wall 16 and the panel 19 to accommodate the rotary shutter F of the camera. The cover plate 18 is also provided with an aperture 21 disposed in alignment with the axis of the lens C and the apertures 17 and 20, and said cover plate has mounted for vertical sliding movement on its rear face in vertical transversely spaced parallel guideways 22, a carrier member 23 which, as illustrated, is of hollow construction approximately of a depth to snugly fit between the panel 19 and cover plate 18 when said cover plate is secured to the front wall B of the camera in covering relation to the recess 15. The cover plate may be secured in any desired manner, such as by the screws 24 which are suitably anchored in the front wall B. The carrier member 23 is provided adjacent its lower end with a forwardly projecting manipulating stud 25 which extends through a vertical slot 26 in the cover plate and affords a means for effecting vertical relative sliding movement of the member 23 with respect to the cover plate, front wall B and other stationary parts of the camera. The carrier member 23 is provided with vertically spaced apertures 27 and 28 in its front wall 29 which are designed upon vertical shifting movement of the member 23 to be selectively brought into register with the aperture 21 and the cover plate 18. The member 23 is further provided with an aperture 30 in its rear wall 31 which is disposed in alignment with the aperture 28 and which is adapted upon shifting movement of the member 23 upwardly to register with the apertures 17, 20 and 21, whereby a direct passage of light through the axis of the lens and onto the film G is afforded, as illustrated in Figure 8 of the drawings. The carrier member 23 is fitted with a reflecting surface 32 disposed at a 45° angle to the axis of the lens C, supported within the member 23 and inclining upwardly and rearwardly from the lower edge of the aperture 27 in the front wall 29. A translucent ground glass surface 33 is supported horizontally by the upper end of the member 23 and is disposed at a right angle to the plane of the film and in a position to display an image received through the lens C and reflected by the reflecting surface 32, when the member 23 is shifted to dispose the aperture 27 in registry with the aperture 21, as illustrated in Figure 7 of the drawings. Obviously, when the member 23 is in the position illustrated in Figure 7, the apertures 17 and 20 are covered so as to prevent light from striking the film G which is disposed within the body A of the camera and moved intermittently past the apertures 17 and 20 by the film feeding mechanism H. In order to facilitate the observation of an image on the ground glass surface 33, an eye-piece 34 is supported by the cover plate and is disposed adjacent the upper end of the front wall B of the camera in a convenient position, whereby the operator may view the ground glass surface 33 through the eye-piece lens 35.

In order to provide means for determining the proper stop or lens opening to be used for obtaining the proper exposure, without employing separate exposure meters and without resorting to the necessity of reading the stop calibrations on the camera lens, a translucent screen 36 is employed, having what may be termed a major design 37 thereon and a plurality of minor designs 38. The screen 36 is carried by a frame 39 which is fulcrumed on the rearwardly projecting pin 40 and is normally swung by a spring 41 to a position to overlie the upper end of the carrier member 23 and in a plane parallel to the ground glass surface 33 when the carrier 23 is in the lowered position illustrated in Figure 7. The screen, however, is designed to be swung upwardly to a vertical out-of-the-way position by the engagement of the upper end of the member 23 with the screen frame 39 when said carrier member is shifted upwardly to its inactive position. In order to provide means for selectively moving the screen 36 to its active and inactive positions when the carrier member is disposed in the lower position, as illustrated in Figures 4 and 5 of the drawings, the eye-piece 34 is mounted for cooperative shifting movement to engage and disengage the actuating finger 42 of the screen frame 39. The eye-piece 34 is mounted for vertical shifting movement by the slidable fitting of its base wall 43 in the grooved portion 44 of the cover plate 18, and a rack 45 is provided on the rear wall of the eye-piece with which a pinion 46 engages, to effect vertical shifting movements of the eye-piece by the turning of the pinion through the medium of a manipulating knob 47 secured to the free extremity of the laterally projecting pinion shaft 48. It is thus apparent that with the focusing device in its active position, upward shifting movement of the eye-piece 34 will retract the downwardly projecting extremity 49 upwardly away from the finger 42 of the screen frame and will initially permit the spring 41 to function to move the exposure meter screen downwardly to its active position, where it is disposed in parallel spaced relation to the ground glass surface 33. After the screen has been initially moved to its active position, the eye-piece may be further moved upwardly to properly focus the eye-piece lens 35 on the screen to compensate for variations in the vision of the users. This accomplished, the user next opens or closes the stop or lens opening until the major design 37 is clearly visible and the adjustment of the lens opening or stop continues until the minor designs 38 are clearly visible, indicating to the user that the proper stop or lens opening has been obtained for a proper exposure of the image on the film. Obviously, this is of great advantage, in that the user not only is capable of almost instantly focusing the lens by directly viewing the image therethrough, but can rapidly determine the proper stop or lens opening for the proper exposure while the camera is focused on the object which is to be photographed.

Figure 10:
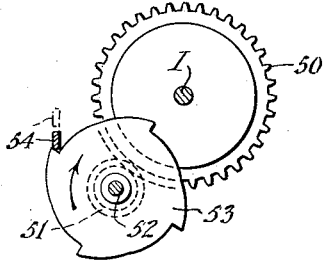
Figure 10 is an enlarged fragmentary detail sectional view taken approximately on the line indicated at 10—10 in Figure 3.

In order to preclude any possibility of feeding the film while the carrier 23 is in its lowered position, the shaft I of the film feeding mechanism is provided with a gear 50 which meshes with a pinion 51 keyed on a counter-shaft 52, which counter-shaft is provided with a ratchet wheel 53. A detent element 54 is normally maintained out of the path of movement of the teeth of the ratchet wheel by a spring 55, while said detent element, which is fulcrumed as at 56, is provided with an actuating terminal 57 which is disposed in the path of movement of and is engaged by the lower portion of the carrier member 23 when said carrier member is moved downwardly. This throws the detent member 54 into the active position shown in full lines in Figure 10, to restrain the counter-shaft 52 against rotation and to consequently lock the film feeding shaft I of the film feeding mechanism H against movement until the carrier member 23 has been moved to its uppermost position, so as not to obstruct the passage of light through the camera lens C onto the film G.

From the foregoing, it will thus be seen that a focus and exposure determining means has been devised for cameras, by virtue of which the user or operator is equipped with accurate means for focusing the camera lens by viewing the image through the lens, while positive means has been provided for accurately gauging the proper exposure stop or lens opening to be employed, and this in a highly efficient manner without unnecessarily complicating the camera structure or detracting from the general appearance thereof.

While there have been illustrated certain structural details, it is to be clearly understood that no limitation is made thereto, but that variations and modifications which properly fall within the scope of the claims may be resorted to when desired.

What is claimed is:

1. In a motion picture camera, a focus determining device having a ground glass surface and a fixedly related angular reflecting surface, means for mounting said device for shifting movement in a plane parallel to the exposure path of the film whereby said reflecting surface may be disposed respectively in an inactive non-obstructing relation to the film or in an active optical relation to the lens of the camera for defining the image on the ground glass surface to gauge the proper focusing of the camera lens and means operable by said device when shifted out of its inactive position for preventing operation of the shutter and film feeding mechanism, said latter means consisting of a normally inactive detent for the shutter operating and film feeding mechanism of the camera and a portion of said detent disposed in the path of movement of said device and engageable by said device when said device is moved from its inactive position.

2. In a camera, a focus and exposure determining device including an element having a ground glass surface and a fixedly related angularly disposed reflecting surface, means for mounting said element for shifting movement in a plane parallel to the film whereby said reflecting surface may be disposed respectively in an inactive non-obstructing relation to the lens or in an active optical relation to said lens for reflecting the image onto the ground glass surface to gauge the focusing of the lens, an exposure screen movable respectively to active and inactive optical relations to said ground glass surface, an eye-piece having a lens shiftable relative to said ground glass surface and means for effecting the movement of said exposure screen coincidently with the shifting of the eye-piece whereby to focus the eye-piece lens with reference to the ground glass surface or exposure screen.

3. In a motion picture camera, a focus and exposure determining device including a member carrying a ground glass surface and an angularly disposed reflecting surface having fixed relation to the ground glass surface, means for mounting said member for shifting movement in a plane parallel to the exposure path of the film whereby said reflecting surface may be respectively brought into an inactive non-obstructing relation to the camera lens and film or into active optical relation to the camera lens and between said lens and the film, an exposure screen normally movable to an active position parallel with the ground glass surface when said member is in its active position, an eye-piece movable relative to said screen and interengaging means on said screen and eye-piece for shifting the screen into and out of its active relation to the ground glass surface.

4. In a motion picture camera, a focus and exposure determining device including a member carrying a ground glass surface and an angularly disposed reflecting surface having fixed relation to the ground glass surface, means for mounting said member for shifting movement in a plane parallel to the exposure path of the film whereby said reflecting surface may be respectively brought into an inactive non-obstructing relation to the camera lens and film or into active optical relation to the camera lens and between said lens and the film, an exposure screen normally movable to an active position parallel with the ground glass surface when said member is in its active position, an eye-piece having a lens and mounted for movement relative to the screen, interengaging means on said eye-piece and screen operable upon and during a part of the relative movement therebetween, to shift the screen into and out of its active relation to the ground glass surface, the remaining relative movement of said eye-piece with reference to the exposure screen when said exposure screen is in its active relation to the ground glass surface, serving to focus the eye-piece lens with respect to the exposure screen.

5. In a motion picture camera, a focus determining device having fixedly angularly related reflecting and ground glass surfaces, means for mounting said device for shifting movement in a plane parallel to the film whereby said reflecting surface may be shifted into active optical relation to the lens of the camera for defining the image on the ground glass surface in order to properly gauge the focusing of the camera lens and whereby said device may be shifted from said active position to a non-obstructing relation to the camera lens and an element for preventing operation of the film feeding mechanism, the element being pivotally mounted so as to be movable into and out of engagement with the film feeding mechanism, and so positioned as to be engaged by the focusing device and moved into engagement with the film feeding mechanism when the said device is moved to its operative position.

6. In a motion picture camera, a focus determining device having fixedly angularly related reflecting and ground glass surfaces, means for mounting said device for shifting movement in a plane parallel to the film whereby said reflecting surface may be disposed respectively in an inactive non-obstructing relation to the camera lens or in an active optical relation to said lens for defining the image on the ground glass surface for gauging the proper focusing of the camera lens and normally restrained, normally inactive means engageable and movable by the focusing device when shifted from its inactive to its active position to engage and to prevent operation of the film feeding mechanism of the motion picture camera.

DAVID BARBIERI.